(12) United States Patent
Miura et al.

(10) Patent No.: US 12,539,854 B2
(45) Date of Patent: Feb. 3, 2026

(54) DRIVING ASSISTANCE DEVICE, DRIVING ASSISTANCE METHOD, AND STORAGE MEDIUM

(71) Applicant: HONDA MOTOR CO., LTD., Tokyo (JP)

(72) Inventors: Aya Miura, Wako (JP); Kenji Komori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 276 days.

(21) Appl. No.: 18/119,345

(22) Filed: Mar. 9, 2023

(65) Prior Publication Data

US 2023/0286503 A1 Sep. 14, 2023

(30) Foreign Application Priority Data

Mar. 11, 2022 (JP) ................................. 2022-038043

(51) Int. Cl.
*B60W 30/14* (2006.01)
*B60W 30/18* (2012.01)
(Continued)

(52) U.S. Cl.
CPC .... *B60W 30/143* (2013.01); *B60W 30/18163* (2013.01); *B60W 40/09* (2013.01); (Continued)

(58) Field of Classification Search
CPC ............................. B60W 40/107; B60W 40/09
(Continued)

(56) References Cited

U.S. PATENT DOCUMENTS

2005/0015203 A1 1/2005 Nishira
2016/0039425 A1\* 2/2016 Jeon ...................... B60W 50/08
701/70
(Continued)

FOREIGN PATENT DOCUMENTS

JP 2005-038325 2/2005
JP 2006-347214 12/2006
(Continued)

OTHER PUBLICATIONS

An_overview_on_control_algorithms_for_automated_highway_systems.pdf (Year: 1999).\*
Japanese Notice Of Allowance for Japanese Patent Application No. 2022-038043 mailed Sep. 30, 2025.

*Primary Examiner* — Navid Z. Mehdizadeh
*Assistant Examiner* — Vincent Feng
(74) *Attorney, Agent, or Firm* — Amin, Turocy & Watson, LLP

(57) ABSTRACT

A driving assistance device includes a storage medium storing computer-readable instructions and a processor connected to the storage medium, the processor executing the computer-readable instructions to generate a target operation amount profile that is a time-series change in a target acceleration operation amount when a mobile object merges into a main lane, and cause an information output device to output information when an actual acceleration operation amount that is an amount of acceleration operation performed on an acceleration operator by a driver of the mobile object has deviated from a prescribed range including the target acceleration operation amount. Generating the target operation amount profile includes changing the target operation amount profile based on a driving tendency of the driver.

4 Claims, 6 Drawing Sheets

(51) Int. Cl.
*B60W 40/09* (2012.01)
*B60W 40/107* (2012.01)
*B60W 50/00* (2006.01)
*B60W 50/14* (2020.01)

(52) U.S. Cl.
CPC ...... *B60W 40/107* (2013.01); *B60W 50/0097* (2013.01); *B60W 50/14* (2013.01); *B60W 2050/143* (2013.01); *B60W 2050/146* (2013.01); *B60W 2520/105* (2013.01); *B60W 2540/106* (2013.01)

(58) Field of Classification Search
USPC .......................................................... 701/93
See application file for complete search history.

(56) References Cited

U.S. PATENT DOCUMENTS

| | | | |
|---|---|---|---|
| 2018/0052458 A1* | 2/2018 | Tsuji | B60W 30/143 |
| 2020/0180645 A1 | 6/2020 | Itoh et al. | |
| 2021/0056714 A1* | 2/2021 | Ishiwatari | H04N 23/60 |
| 2021/0323574 A1 | 10/2021 | Yoo et al. | |

FOREIGN PATENT DOCUMENTS

| | | |
|---|---|---|
| JP | 2008-265407 | 11/2008 |
| JP | 2020-093590 | 6/2020 |

* cited by examiner

DRIVING ASSISTANCE DEVICE, DRIVING ASSISTANCE METHOD, AND STORAGE MEDIUM

CROSS-REFERENCE TO RELATED APPLICATION

Priority is claimed on Japanese Patent Application No. 2022-038043, filed Mar. 11, 2022, the content of which is incorporated herein by reference.

FIELD OF THE INVENTION

Background

The present invention relates to a driving assistance device, a driving assistance method, and a storage medium.

Description of Related Art

In the related art, an operation amount display device configured to calculate an allowable range of an accelerator opening degree by estimating a time-series recommended accelerator opening degree based on an acquired road situation and a travel situation of a vehicle and display a graph in which the accelerator opening degree obtained by a driver's operation, the recommended accelerator opening degree, and the allowable range of the accelerator opening degree are superimposed is disclosed (Japanese Unexamined Patent Application, First Publication No. 2008-265407). When it is detected that the accelerator opening degree due to the driver's actual operation exceeds the allowable range, the operation amount display device highlights the excessive accelerator opening degree on the graph or alerts the driver with an audible alarm or a warning light on the meter.

SUMMARY

In the related art, there is no technology for providing driving assistance at the time of merging into a main lane. Thus, in the related art, at the time of merging into a main lane, it is difficult to provide appropriate driving assistance for an acceleration/deceleration instruction amount of a driver at the time of merging into the main lane in some cases.

The present invention has been made in consideration of such circumstances and an objective of the present invention is to provide appropriate driving assistance for an acceleration/deceleration instruction amount of a driver at the time of merging into a main lane.

A driving assistance device, a driving assistance method, and a storage medium according to the present invention adopt the following configurations.

(1): According to an aspect of the present invention, there is provided a driving assistance device including: a profile generator configured to generate a target operation amount profile that is a time-series change in a target acceleration operation amount when a mobile object merges into a main lane, and an output controller configured to cause an information output device to output information when an actual acceleration operation amount that is an amount of acceleration operation performed on an acceleration operator by a driver of the mobile object has deviated from a prescribed range including the target acceleration operation amount, wherein the profile generator changes the target operation amount profile based on a driving tendency of the driver.

(2): In the above-described aspect (1), the profile generator acquires information of a velocity and acceleration of the mobile object and changes the target operation amount profile so that an initial target acceleration operation amount increases in the target operation amount profile when an index value based on the acceleration is greater than or equal to a reference value set in accordance with the velocity.

(3): In the above-described aspect (2), the profile generator calculates the index value by multiplying the velocity by the acceleration during an observation period.

(4): In any one of the above-described aspects (1) to (3), the profile generator generates the target operation amount profile according to pole-assignment control in a state in which a future state of another mobile object located in the main lane is assumed.

(5): According to another aspect of the present invention, there is provided a driving assistance method including: generating, by a driving assistance device, a target operation amount profile that is a time-series change in a target acceleration operation amount when a mobile object merges into a main lane; and causing, by the driving assistance device, an information output device to output information when an actual acceleration operation amount that is an amount of acceleration operation performed on an acceleration operator by a driver of the mobile object has deviated from a prescribed range including the target acceleration operation amount, wherein generating the target operation amount profile includes changing the target operation amount profile based on a driving tendency of the driver.

(6): According to yet another aspect of the present invention, there is provided a computer-readable non-transitory storage medium storing a program for causing a processor of a driving assistance device to: generate a target operation amount profile that is a time-series change in a target acceleration operation amount when a mobile object merges into a main lane, and cause an information output device to output information when an actual acceleration operation amount that is an amount of acceleration operation performed on an acceleration operator by a driver of the mobile object has deviated from a prescribed range including the target acceleration operation amount, wherein generating the target operation amount profile includes changing the target operation amount profile based on a driving tendency of the driver.

According to the aspects (1) to (6), it is possible to provide appropriate driving assistance for an acceleration/deceleration instruction amount of a driver at the time of merging into a main lane.

DESCRIPTION OF EMBODIMENTS

Hereinafter, embodiments of a driving assistance device, a driving assistance method, and a storage medium of the present invention will be described with reference to the drawings. The driving assistance device is mounted in a mobile object. The mobile object is a structure capable of being autonomously moved by a driving mechanism provided therein, such as a vehicle (which may be a four- or two-wheeled vehicle), micromobility, or an autonomous walking robot. In the following description, the mobile object is assumed to be a vehicle that moves on a road surface.

Figure 1:
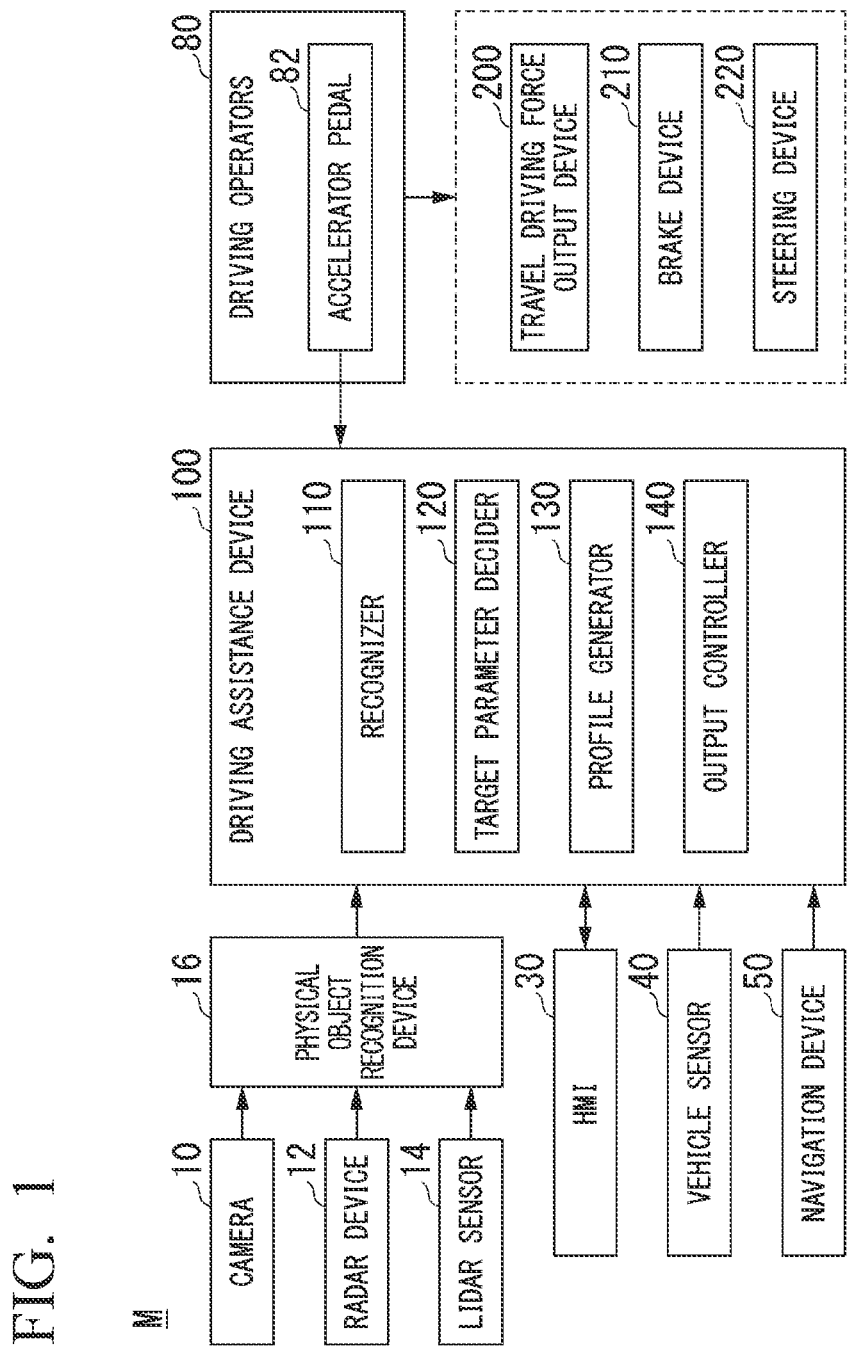
FIG. 1 is a configuration diagram of a vehicle in which a driving assistance device is mounted according to an embodiment.

FIG. 1 is a configuration diagram of a vehicle M in which a driving assistance device 100 of an embodiment is mounted. For example, a camera 10, a radar device 12, a light detection and ranging (LIDAR) sensor 14, a physical object recognition device 16, a human machine interface (HMI) 30, a vehicle sensor 40, driving operators 80, a driving assistance device 100, a travel driving force output device 200, a brake device 210, and a steering device 220 are mounted in the vehicle M. Such devices and equipment are connected to each other by a multiplex communication line such as a controller area network (CAN) communication line, a serial communication line, or a wireless communication network. The configuration shown in FIG. 1 is merely an example and some of the components may be omitted or other components may be further added.

For example, the camera 10 is a digital camera using a solid-state imaging element such as a charge coupled device (CCD) or a complementary metal oxide semiconductor (CMOS). The camera 10 is attached to any location on the vehicle M. When the view in front of the vehicle M is imaged, the camera 10 is attached to an upper part of a front windshield, a rear surface of a rearview mirror, or the like. For example, the camera 10 periodically and iteratively images the surroundings of the vehicle M. The camera 10 may be a stereo camera.

The radar device 12 radiates radio waves such as millimeter waves around the vehicle M and detects at least a position (a distance to and a direction) of a physical object by detecting radio waves (reflected waves) reflected by the physical object. The radar device 12 is attached to any location on the vehicle M. The radar device 12 may detect a position and speed of the physical object in a frequency modulated continuous wave (FM-CW) scheme.

The LIDAR sensor 14 radiates light (or electromagnetic waves of a wavelength close to an optical wavelength) to the vicinity of the vehicle M and measures scattered light. The LIDAR sensor 14 detects a distance to an object based on a time period from light emission to light reception. The radiated light is, for example, pulsed laser light. The LIDAR sensor 14 is attached to any location on the vehicle M.

The physical object recognition device 16 performs a sensor fusion process on detection results from some or all of the camera 10, the radar device 12, and the LIDAR sensor 14 to recognize a position, a type, a speed, and the like of a physical object. The physical object recognition device 16 outputs recognition results to the driving assistance device 100. The physical object recognition device 16 may output detection results of the camera 10, the radar device 12, and the LIDAR sensor 14 to the driving assistance device 100 as they are. Also, the physical object recognition device 16 may be omitted.

The HMI 30 provides an occupant of the vehicle M with various types of information and receives an input operation from the occupant. The HMI 30 includes various types of display devices, a speaker, a buzzer, a vibration generation device (a vibrator), a touch panel, a switch, a key, and the like.

The vehicle sensor 40 includes a vehicle speed sensor configured to detect the speed of the vehicle M, an acceleration sensor configured to detect acceleration, a yaw rate sensor configured to detect an angular speed around a vertical axis, a direction sensor configured to detect a direction of the vehicle M, and the like.

The navigation device 50 includes, for example, a global navigation satellite system (GNSS) receiver, a guidance controller, a storage storing map information, and the like. The GNSS receiver identifies a position of the vehicle M based on a signal received from a GNSS satellite. The position of the vehicle M may be identified or corrected by an inertial navigation system (INS) using an output of the vehicle sensor 40. For example, the guidance controller decides on a route from the position of the vehicle M identified by the GNSS receiver (or any input position) to a destination input by the occupant with reference to the map information and causes the HMI 30 to output guidance information so that the vehicle M travels along the route. The map information is, for example, information in which a road shape is expressed by a link indicating a road and nodes connected by the link. The map information may include curvature of a road, point of interest (POI) information, and the like. The navigation device 50 may transmit a current position and a destination of the vehicle M to a navigation server via a communication device and acquire a route from the navigation server.

The driving operators 80 include, for example, an accelerator pedal 82, a brake pedal, a steering wheel, a shift lever, and other operators. The accelerator pedal 82 is an example of an acceleration operator. A sensor for detecting an amount of operation or the presence or absence of an operation is attached to the driving operator 80 and a detection result thereof is output to some or all of the travel driving force output device 200, the brake device 210, and the steering device 220.

The travel driving force output device 200 outputs a travel driving force (torque) for enabling the vehicle M to travel to driving wheels. For example, the travel driving force output device 200 includes a combination of an internal combustion engine, an electric motor, a transmission, and the like, and an electronic control unit (ECU) that controls the internal combustion engine, the electric motor, the transmission, and the like. The ECU controls the above-described components in accordance with information input from the driving assistance device 100 or information input from the driving operator 80.

For example, the brake device 210 includes a brake caliper, a cylinder configured to transfer hydraulic pressure to the brake caliper, an electric motor configured to generate hydraulic pressure in the cylinder, and the ECU. The ECU controls the electric motor in accordance with the information input from the driving assistance device 100 or the information input from the driving operator 80 so that brake torque according to a braking operation is output to each wheel. The brake device 210 may include a mechanism configured to transfer the hydraulic pressure generated according to an operation on the brake pedal included in the driving operators 80 to the cylinder via a master cylinder as a backup. The brake device 210 is not limited to the above-described configuration and may be an electronically controlled hydraulic brake device configured to control an actuator in accordance with information input from the driving assistance device 100 and transfer the hydraulic pressure of the master cylinder to the cylinder.

For example, the steering device 220 includes a steering ECU and an electric motor. For example, the electric motor changes a direction of steerable wheels by applying a force to a rack and pinion mechanism. The steering ECU drives the electric motor in accordance with the information input from the driving assistance device 100 or the information input from the driving operator 80 to change the direction of the steerable wheels.

[Driving Assistance Device]

The driving assistance device 100 operates when the vehicle M merges into a main lane. Also, in the following description, the recognizer 110 may operate all the time regardless of a situation in which the vehicle M is placed. A situation of merging into the main lane includes, for example, a situation of merging from a branching lane (a merging road) into the main lane, a situation of merging into the main lane as a vehicle width is reduced from an area where a vehicle width is enlarged in front of or behind a toll gate and the like, and the like. In the following description, a situation where the vehicle M merges from the branching lane into the main lane will be described as an example. The situation where the vehicle M merges into the main lane is recognized, for example, based on a position of the vehicle M measured by the navigation device 50 and map information therefrom.

The driving assistance device 100 includes, for example, a recognizer 110, a target parameter decider 120, a profile generator 130, and an output controller 140. Functional parts of the recognizer 110, the target parameter decider 120, the profile generator 130, and the output controller 140 are implemented, for example, by a hardware processor such as a central processing unit (CPU) executing a program (software). Also, some or all of the above components may be implemented by hardware (including a circuit; circuitry) such as a large-scale integration (LSI) circuit, an application specific integrated circuit (ASIC), a field-programmable gate array (FPGA), or a graphics processing unit (GPU) or may be implemented by software and hardware in cooperation. The program may be stored in a storage device (a storage device including a non-transitory storage medium) such as an HDD or a flash memory of the driving assistance device 100 in advance or may be stored in a removable storage medium such as a DVD or a CD-ROM and installed in the HDD or the flash memory of the driving assistance device 100 when the storage medium (the non-transitory storage medium) is mounted in a drive device.

The recognizer 110 recognizes states of positions, speeds, acceleration, and the like of physical objects near the vehicle M based on information input from the camera 10, the radar device 12, and the LIDAR sensor 14 via the physical object recognition device 16. For example, the position of the physical object is recognized as a position on absolute coordinates with a representative point (a center of gravity, a driving shaft center, or the like) of the vehicle M as the origin and is used for control. The position of the physical object may be represented by a representative point such as a center of gravity or a corner of the physical object or may be represented by a represented area. The "state" of a physical object may include acceleration or jerk of the physical object.

Also, for example, the recognizer 110 recognizes a lane in which the vehicle M is traveling (a traveling lane). For example, the recognizer 110 recognizes the traveling lane by comparing a pattern of road markings (for example, an arrangement of solid lines and broken lines) obtained from the map information of the navigation device 50 with a pattern of road markings in the vicinity of the vehicle M recognized from an image captured by the camera 10. Also, the recognizer 110 may recognize the traveling lane by recognizing a traveling path boundary (a road boundary) including a road marking, a road shoulder, a curb, a median strip, a guardrail, or the like as well as a road marking. In this recognition, a position of the vehicle M acquired from the navigation device 50 or a processing result of the INS may be taken into account.

Figure 2:
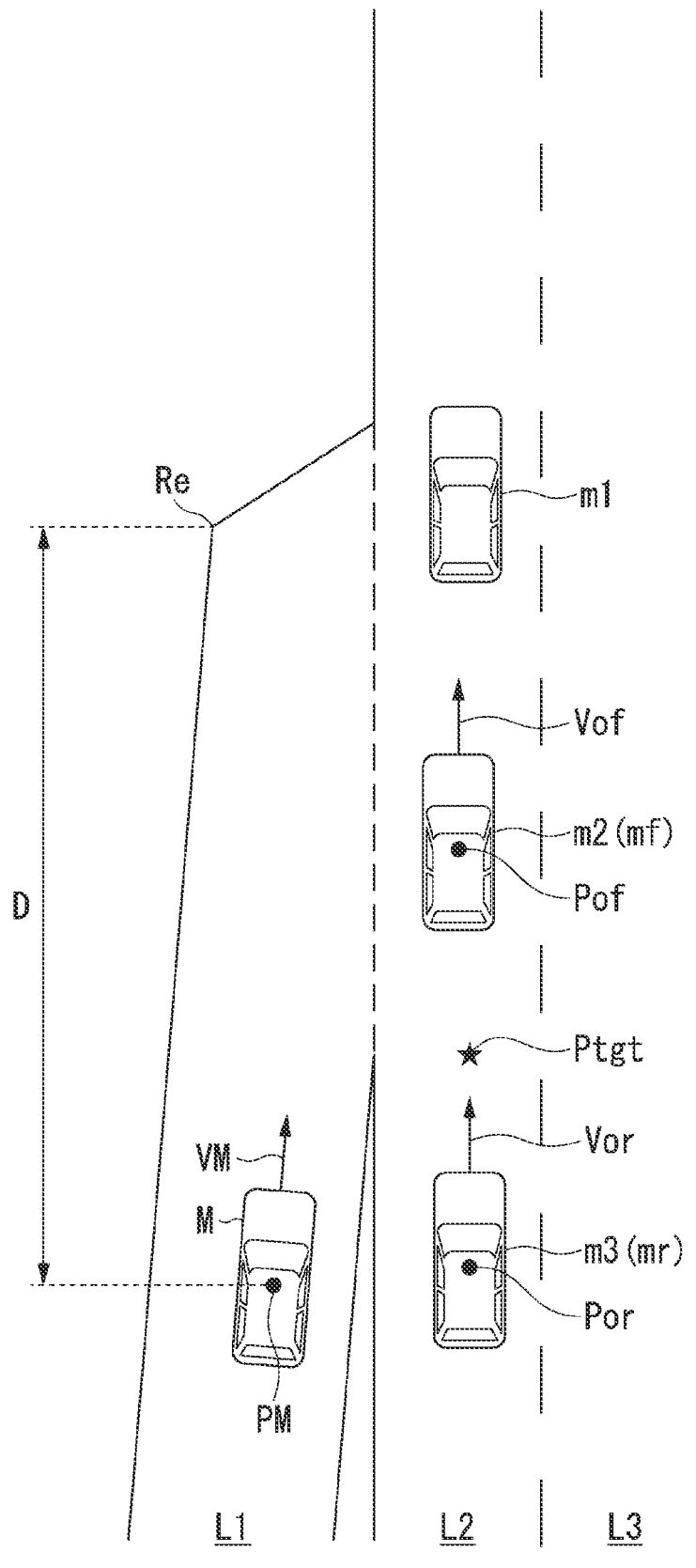
FIG. 2 is a diagram for describing a process of a target parameter decider.

FIG. 2 is a diagram for describing a process of the target parameter decider 120. The target parameter decider 120 decides on a target relative position Ptgt and a target relative velocity Vmt. When the merging or lane change from a first lane (a branching lane) L1 to a second lane (one of main lanes) L2 is performed, the target parameter decider 120 decides on the target relative position Ptgt of an area (hereinafter, a target area) between two other vehicles (hereinafter referred to as a forward reference vehicle mf and a rearward reference vehicle mr) located in a state in which there is no vehicle between the two other vehicles in a second lane L2. A set of the forward reference vehicle mf and the rearward reference vehicle mr may be able to be selected from one or more candidates. The target parameter decider 120 may calculate a score based on, for example, a travel distance to the merging, required acceleration/deceleration, an inter-vehicle distance between the forward reference vehicle mf and the rearward reference vehicle mr, and the like, and select the set of the forward reference vehicle mf and the rearward reference vehicle mr in a comprehensive evaluation or may simply select a set of a forward reference vehicle mf and a rearward reference vehicle mr between which a target area is closest to the vehicle M, or may switch a selection method thereof in accordance with a situation. The method of selecting the set of the forward reference vehicle mf and the rearward reference vehicle mr is not a core part of the present invention, and more detailed description thereof is omitted. In the example of FIG. 2, it is assumed that m2 is selected as the forward reference vehicle mf and m3 is selected as the forward reference vehicle mf among the other vehicles.

When the set of the forward reference vehicle mf and the rearward reference vehicle mr is selected, the target parameter decider 120 decides on the target relative position Ptgt based on the positions of a representative point Pof of the forward reference vehicle mf and a representative point Por of the rearward reference vehicle mr. As the "representative point," the center of gravity of the vehicle, the center of the drive shaft, the center of the front end, or the center of the rear end can be arbitrarily defined. The definition may differ according to the vehicle so that the representative point of the forward reference vehicle mf is the center of the rear end and the representative point of the rearward reference vehicle mr is the center of the front end. In the example of FIG. 2, the representative point is assumed to be the center of gravity. Likewise, a representative point PM of the vehicle M is assumed to be the center of gravity. For example, the target parameter decider 120 decides on an intermediate position between the representative point Pof of the forward reference vehicle mf and the representative point Por of the rearward reference vehicle mr as the target relative position Ptgt. Alternatively, the target parameter decider 120 may decide on a position forward shifted by a prescribed amount (or a prescribed ratio) from the intermediate position as the target relative position Ptgt or may decide on a position rearward shifted by a prescribed amount from the representative point Pof of the rearward reference vehicle mf as the target relative position Ptgt. The target relative position Ptgt is not a position fixedly decided on with respect to a point, but is a relative position that moves as the forward reference vehicle mf and the rearward reference vehicle mr move by iterating the determination process.

The target velocity Vtgt is a velocity that is a target value of the velocity VM of the vehicle M when the vehicle M has reached the target relative position Ptgt. The target parameter decider 120 decides on, for example, a velocity Vof of the forward reference vehicle mf as the target velocity Vtgt. Alternatively, the target parameter decider 120 may decide on an intermediate value or a weighted sum of the velocity Vof of the forward reference vehicle mf and a velocity Vor of the rearward reference vehicle mr or the like as the target velocity Vtgt or may select one of the velocity Vof of the forward reference vehicle mf and the velocity Vor of the rearward reference vehicle mr and decide on the selected velocity as the target velocity Vtgt. Also, the velocity VM of the vehicle M may have an angle with respect to an extending direction of the second lane L2. However, in this case, a velocity obtained by projecting the measured velocity of the vehicle M in the extending direction of the second lane L2 may be set as the velocity VM of the vehicle M or the measured velocity of the vehicle M may be used as the velocity VM of the vehicle M as it is.

The profile generator 130 generates a time-series target acceleration profile of a case where it is assumed that the velocity of the vehicle M is adjusted until the vehicle M reaches the target relative position Ptgt and generates a target-acceleration-specific target operation amount profile for implementing a target acceleration profile. Hereinafter, the target-acceleration-specific target operation amount profile is referred to as a target accelerator opening degree profile because the accelerator opening degree, which is the operation amount of the accelerator pedal 82, is an example of the acceleration operation amount.

Figure 3:
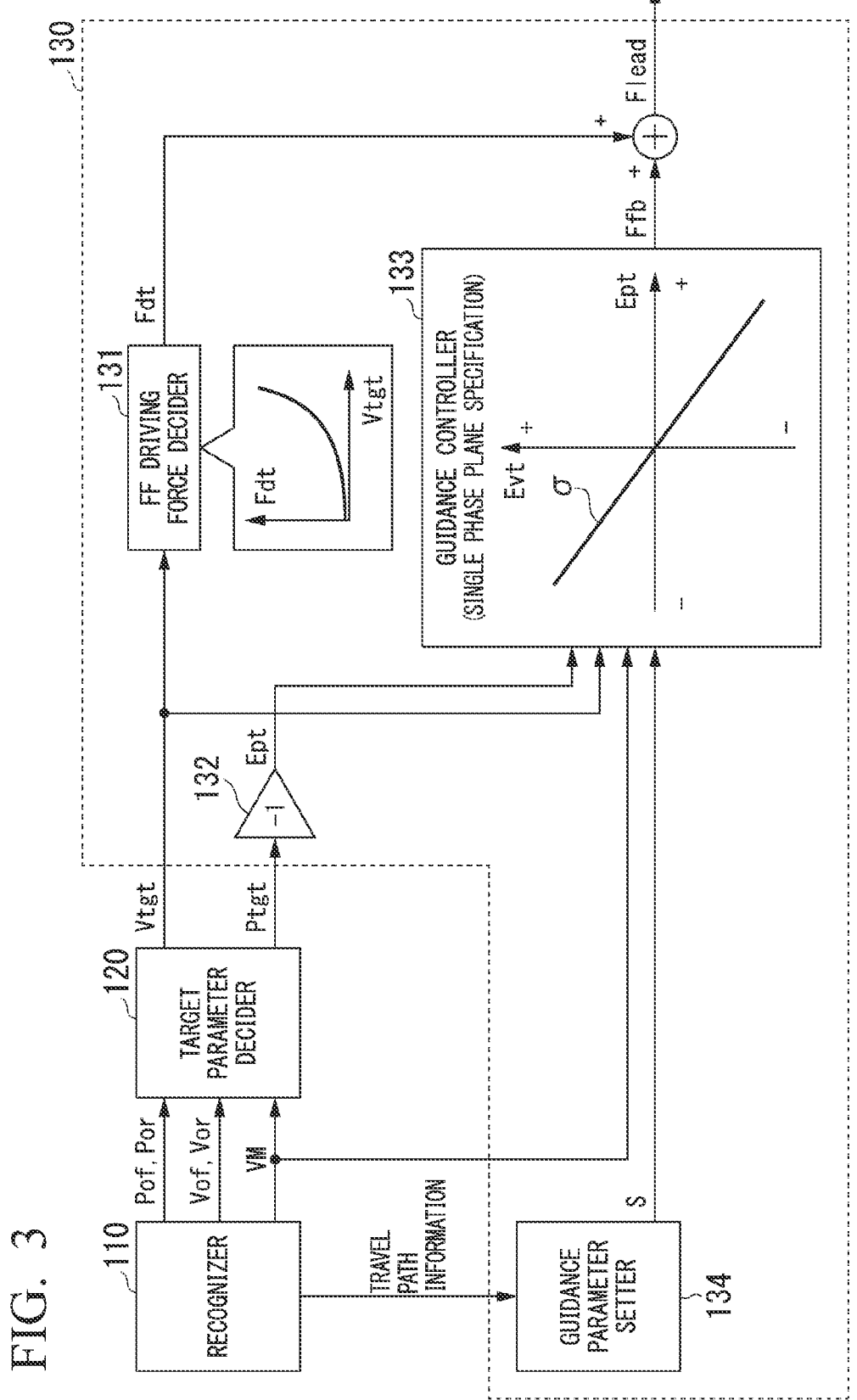
FIG. 3 is a diagram for describing a process of a profile generator.

The profile generator 130 iteratively executes the following process on the assumption that, for example, the other vehicle has maintained its current velocity or continued to travel with constant acceleration. FIG. 3 is a diagram for describing the process of the profile generator 130. The profile generator 130 includes, for example, a feedforward (FF) driving force decider 131, a multiplier 132, a guidance controller 133, and a guidance parameter setter 134.

Again, the recognizer 110 outputs the position Pof of the forward reference vehicle mf, the position Por of the rearward reference vehicle mr, the velocity Vof of the forward reference vehicle mf, the velocity Vor of the rearward reference vehicle mr, and the velocity VM of the vehicle M to the target parameter decider 120. The target parameter decider 120 decides on the target relative position Ptgt and the target velocity Vtgt as described above based on the information thereof.

The FF driving force decider 131 decides on the feedforward driving force Fdt required for traveling at the target velocity Vtgt in consideration of traveling resistance. For example, the FF driving force decider 131 decides on the feedforward driving force Fdt by applying the target velocity Vtgt input from the target parameter decider 152 to corresponding information, which is a table or map in which the required feedforward driving force Fdt is associated with the target velocity Vtgt. The FF driving force decider 131 decides on the feedforward driving force Fdt so that the feedforward driving force Fdt increases as the target velocity Vtgt increases and a change rate of the feedforward driving force Fdt increases with respect to the amount of increase in the target velocity Vtgt as the target velocity Vtgt increases.

The multiplier 132 calculates position deviation Ept by multiplying the target relative position Ptgt by a coefficient such as −1. If the target relative position Ptgt is originally decided on with reference to the representative point PM of the vehicle M, the position deviation is obtained by multiplying by −1 as described above.

The guidance controller 133 first calculates the velocity deviation Evt by subtracting the target velocity Vtgt from the velocity VM of the vehicle M (Eq. (1)). In Eq. (1), k denotes a control cycle. The process of the profile generator 130 is iteratively executed at a prescribed cycle and k denotes a parameter indicating how many times the process has been iterated. In the following description, the notation of "(k)" is omitted.

$$Evt(k)=VM(k)-Vtgt(k) \quad (1)$$

The guidance controller 133 calculates a guidance feedback driving force Ffb according to pole-assignment control (for example, sliding mode control, backstepping control, or the like) based on the position deviation Ept and the velocity deviation Evt and therefore controls the velocity of the vehicle M. The guidance controller 133 calculates the guidance feedback driving force Ffb so that a switching function 6 in which the position deviation Ept and the velocity deviation Evt are linearly combined is close to zero and the position deviation Ept and the velocity deviation Evt are close to zero (for example, by exponential decay). The switching function 6 is represented by Eq. (2). In Eq. (2), S denotes a guidance parameter and is set to a value larger than zero and less than one. The speed of the convergence of the position deviation Ept to zero increases (i.e., the vehicle M quickly reaches the vicinity of the target relative position Ptgt) as the value of the guidance parameter S increases, while there is a property that the acceleration/deceleration for bringing the velocity deviation Evt close to zero also increases immediately before the vehicle M reaches the target relative position Ptgt. When the guidance parameter S is large, the slope of the switching function 6 in the shown phase plane (a plane whose axes represent the position deviation Ept and the velocity deviation Evt) becomes nearly vertical. This is because it is meant that the velocity deviation Evt is also allowed even if the velocity deviation Evt has a relatively large value at a point in time when the position deviation Ept and the velocity deviation Evt are close to zero. A method of setting the guidance parameter S based on the driving environment of the vehicle M will be described below. The guidance feedback driving force Ffb is added to the feedforward driving force Fdt and output as the control input Flead.

$$\sigma(k)=Ept(k)+S(k)\cdot Evt(k) \quad (2)$$

The guidance controller 133 calculates the guidance feedback driving force Ffb based on, for example, Eqs. (3) to (6). In Eqs. (3) to (6), Ffb_rch denotes an reaching law input, Ffb_adp denotes an adaptive law input, Ffb_eq denotes an equivalent control input, M is to weight of the vehicle M, and Krch and Kadp denote feedback gains. The equivalent control input Ffb_eq is the term that acts so that a switching function σ is constrained to zero after the switching function σ becomes zero (in other words, the position deviation Ept and the velocity deviation Evt are constrained to a control line where the switching function σ is zero). By taking into account the equivalent control input Ffb_eq, the feedback gain of the controller as a whole can be increased and faster merging can be achieved as a result.

$$Ffb\_rch(k) = Krch \cdot \sigma(k) \quad (3)$$

$$Ffb\_adp(k) = Ffb\_adp(k-1) + Kadp \cdot \sigma(k) \quad (4)$$

$$Ffb\_eq(k) = -M \cdot Evt(k)/S(k) \quad (5)$$

$$Ffb(k) = Ffb\_rch(k) + Ffb\_adp(k) + Ffb\_eq(k) \quad (6)$$

The guidance parameter setter 134 acquires travel path information from the recognizer 110. The travel path information includes a distance (available merging distance) D from the position of the vehicle M to a disappearing position Re of a lane L1 (see FIG. 2). The guidance parameter setter 134 sets the guidance parameter S so that the guidance parameter S decreases as the distance D increases and the guidance parameter S increases as the distance D decreases. Thereby, when the remaining distance to the merging is short, the position deviation Ept can be preferentially set to zero and quick merging can be implemented. On the other hand, when the distance D is sufficiently long, the guidance parameter S is reduced to perform merging control that prioritizes riding comfort and suppresses acceleration and deceleration. In the case of a lane change instead of merging, in principle, because there is no disappearing position Re of the first lane, D is set to a sufficiently large value and the guidance parameter S is set to a sufficiently small value.

By calculating the control input Flead as described above, the position deviation Ept and the velocity deviation Evt can be brought close to zero substantially simultaneously. For example, the profile generator 130 obtains a target accelerator opening degree AC # (an example of a target acceleration operation amount) by calculating a function using the control input Flead, the velocity VM of the vehicle M, and the like as parameters (Eq. (7)).

$$AC\# = f(Flead, VM) \quad (7)$$

As described above, the profile generator 130 generates a target accelerator opening degree profile that is a time-series target accelerator opening degree AC # by iteratively performing the above-described process on the assumption that another vehicle has maintained its current speed or continued to travel with constant acceleration. Although an example of a configuration including a guidance controller with a single-phase plane specification is shown in FIG. 3, the profile generator 130 may include a guidance controller with another specification such as a cascade specification.

Figure 4:
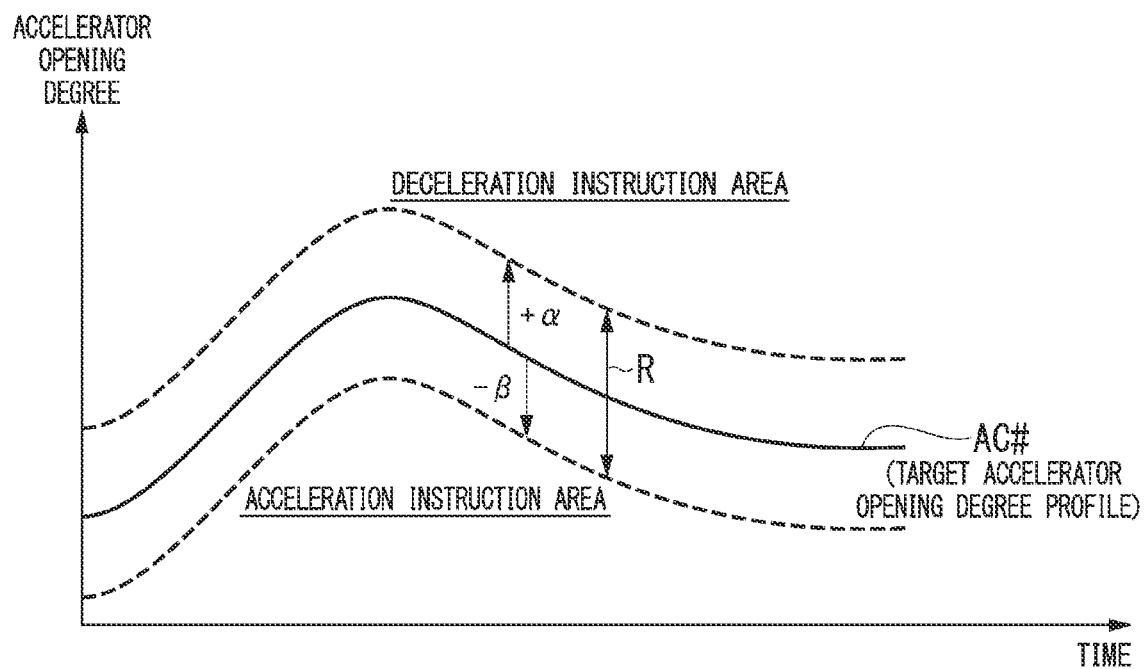
FIG. 4 is a diagram for describing a process of an output controller.

The output controller 140 causes the HMI 30 to output information when the actual accelerator opening degree AC (an example of the actual acceleration operation amount), which is the operation amount of the accelerator pedal 82, has deviated from a prescribed range including the target accelerator opening degree AC #. FIG. 4 is a diagram for describing the process of the output controller 140. As shown in FIG. 4, R denotes an example of a prescribed range that varies in accordance with the elapse of time. The prescribed range R is set, for example, to a range in which an upper limit value is a value obtained by adding α% to the target accelerator opening degree AC # and a lower limit value is a value obtained by subtracting β% from the target accelerator opening degree AC #. α and β may be the same value or may be different values. Also, each of the upper limit value and the lower limit value may be obtained by multiplying the target accelerator opening degree AC # by a coefficient. The output controller 140 causes the HMI 30 to output deceleration instruction information when the actual accelerator opening degree AC is greater than the upper limit value of the prescribed range and causes the HMI 30 to output acceleration instruction information when the actual accelerator opening degree AC is less than the lower limit value of the prescribed range. "Causing the HMI 30 to output information" indicates causing the HMI 30 to generate a phenomenon that the driver recognizes the meaning of the information by voice, sound effect, image display, or the like. Thereby, it is possible to guide the driver to operate the accelerator pedal 82 along the target accelerator opening degree profile.

Here, it is assumed that the process in which the driver moves the vehicle M to the side of the target relative position Ptgt varies with the driver's driving tendency. This is because some drivers first accelerate greatly and try to adjust the velocity when the target relative position Ptgt is reached and other drivers may first consider an adjustment of a relative velocity. Therefore, if the target accelerator opening degree profile is uniform for all drivers, there is a possibility that certain types of drivers will feel uncomfortable.

Figure 5:
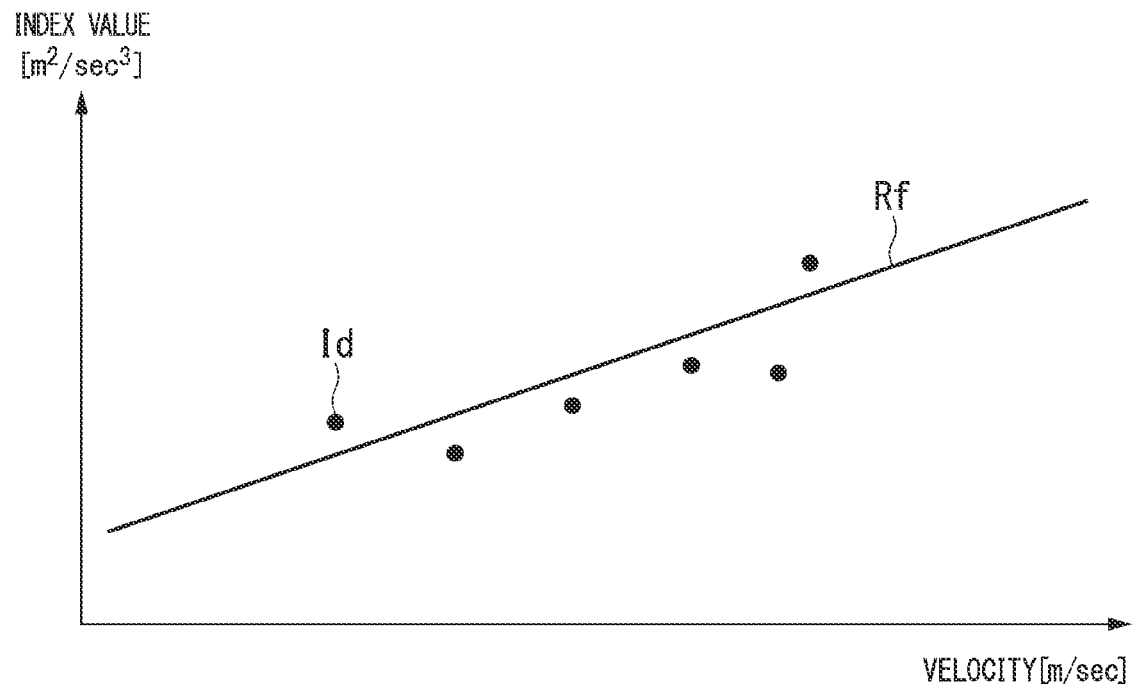
FIG. 5 is a diagram for describing a relationship between an index value and a reference value.

Therefore, the profile generator 130 reduces the above-described problem by changing the target accelerator opening degree profile based on the driver's driving tendency. For example, the profile generator 130 acquires information of the velocity and acceleration of the vehicle M from the vehicle sensor 40 and changes the target accelerator opening degree profile in a direction in which an initial target accelerator opening degree increases in the target accelerator opening degree profile when the index value based on the acceleration is greater than or equal to a reference value set in accordance with the velocity. The index value based on acceleration is, for example, an index value (unit: $m^2/sec^3$) obtained by multiplying a velocity by acceleration during an observation period (for example, about 0.1 [sec] to several seconds [sec]). The reference value set in accordance with the velocity is, for example, a reference value set to monotonically increase as the velocity increases. FIG. 5 is a diagram for describing a relationship between an index value and a reference value. In FIG. 5, Id denotes an index value and Rf denotes a reference value. Other types of index values based on acceleration may be used as the index value. Also, "when the index value based on acceleration is greater than or equal to the reference value set in accordance with the velocity" may indicate "when the number of times the index value is greater than or equal to the reference value in a prescribed period is greater than or equal to the prescribed number of times." The prescribed period can be set to any period such as several tens of minutes, one hour, one week, one month, or a period from the current time to a certain time thereof.

Figure 6:
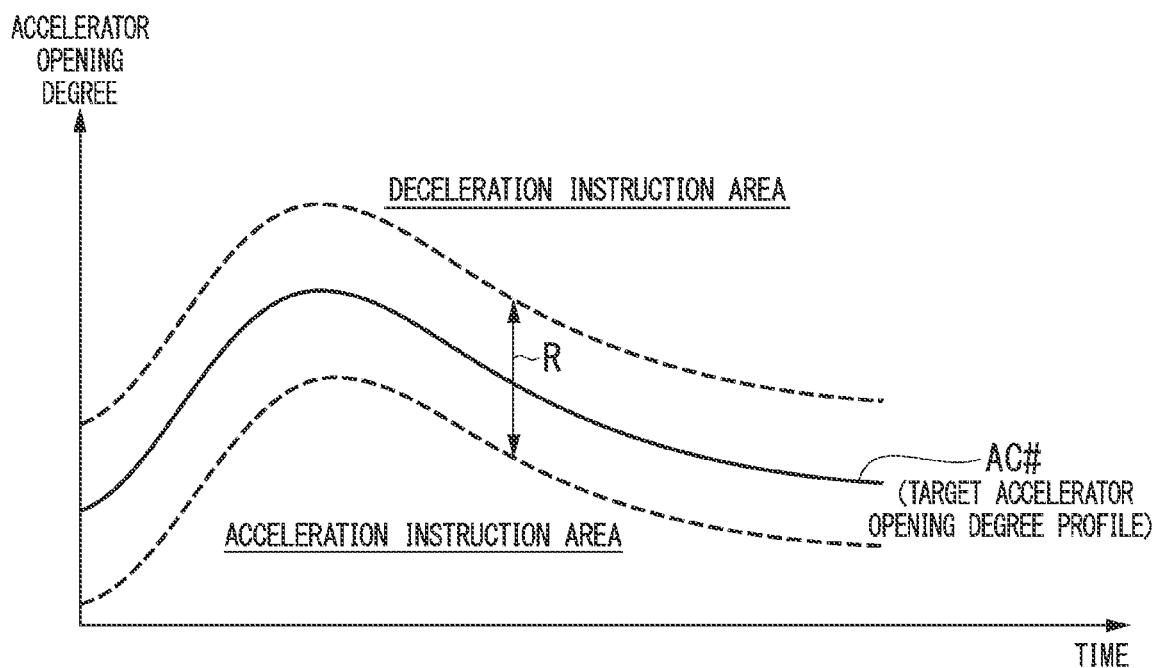
FIG. 6 is a diagram showing an example of a target accelerator opening degree profile set for a driver whose index value is greater than or equal to a reference value.

FIG. 6 is a diagram showing an example of a target accelerator opening degree profile set for a driver whose index value is greater than or equal to the reference value. In the comparison with the target accelerator opening degree profile shown in FIG. 4, a degree of increase in the target accelerator opening degree AC # at the beginning of merging is high, while the target accelerator opening degree AC # is low at the final stage of merging. Thereby, it is possible to adapt to the driving tendency of the driver in a type in which "acceleration is first performed and then the position adjustment and the velocity adjustment are made." The profile generator 130 may change the target accelerator opening degree profile with respect to the target accelerator opening degree profile itself, which is time-series data or by adjusting the guidance parameter S. For example, by increasing the guidance parameter S, it is possible to increase the degree of increase in the target accelerator opening degree AC # at the beginning of flow.

Figure 7:
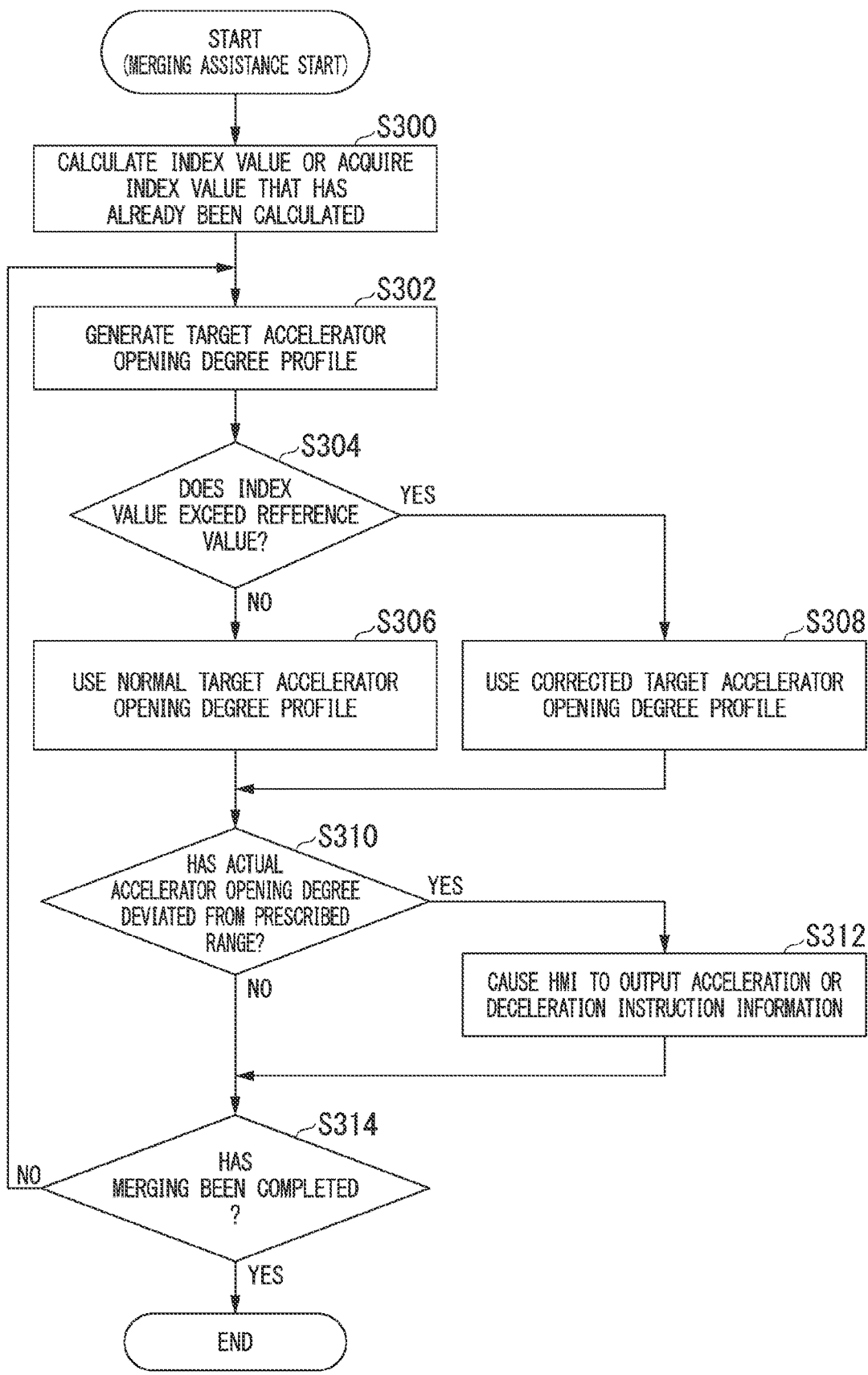
FIG. 7 is a flowchart showing an example of a flow of a process executed by the driving assistance device.

FIG. 7 is a flowchart showing an example of a flow of a process executed by the driving assistance device 100. The process of the present flowchart is started when the vehicle M merges into a main lane.

First, the profile generator 130 calculates an index value or acquires an index value that has already been calculated and stored in the storage device (step S300).

Subsequently, the profile generator 130 generates a target accelerator opening degree profile (step S302) and determines whether or not the index value calculated or acquired in step S300 exceeds a reference value (step S304). The content of the determination process in step S304 is as described above. When it is determined that the index value does not exceed the reference value, the profile generator 130 uses the normal target accelerator opening degree profile (generated in step S302) (step S306). On the other hand, when it is determined that the index value exceeds the reference value, the profile generator 130 uses a corrected target accelerator opening degree profile (step S308).

Subsequently, the output controller 140 determines whether or not the actual accelerator opening degree AC has deviated from a prescribed range including the target accelerator opening degree AC #(step S310). When the actual accelerator opening degree AC has deviated from the prescribed range, the output controller 140 causes the HMI 30 to output acceleration or deceleration instruction information (step S312).

Subsequently, the driving assistance device 100 determines whether or not the merging into the main lane has been completed (step S314). When it is determined that the merging into the main lane has been completed, the process of the present flowchart ends. When it is determined that the merging into the main lane has not been completed, the process returns to step S302.

According to the embodiment described above, it is possible to provide appropriate driving assistance for an acceleration/deceleration instruction amount of a driver at the time of merging into a main lane by generating a target accelerator opening degree profile, which is a time-series change in the target accelerator opening degree AC # when the vehicle M merges into the main lane, causing the HMI 30 to output information when the accelerator opening degree AC, which is an amount of acceleration operation performed by the driver on the accelerator pedal 82 has deviated from a prescribed range including the target accelerator opening degree AC #, and changing the target accelerator opening degree profile based on the driving tendency of the driver.

Although modes for carrying out the present invention have been described above using embodiments, the present invention is not limited to the embodiments and various modifications and substitutions can also be made without departing from the scope and spirit of the present invention.

What is claimed is:

1. A driving assistance device comprising:
a storage medium storing computer-readable instructions; and
a processor connected to the storage medium, the processor executing the computer-readable instructions to:
generate a target operation amount profile that is a time-series change in a target acceleration operation amount in a case where it is assumed that a velocity of a mobile object is adjusted until the mobile object reaches a target relative position when the mobile object merges into a main lane,
cause an information output device to output information when an actual acceleration operation amount that is an amount of acceleration operation performed on an acceleration operator by a driver of the mobile object has deviated from a prescribed range including the target acceleration operation amount,
acquire information of a velocity and acceleration of the mobile object,
change the target operation amount profile so that an initial target acceleration operation amount increases in the target operation amount profile when an index value based on the acceleration is greater than or equal to a reference value set in accordance with the velocity,
calculate the index value by multiplying the velocity by the acceleration during an observation period, and
set the reference value such that the reference value is set to monotonically increase as the velocity increases.

2. The driving assistance device according to claim 1, wherein the processor generates the target operation amount profile according to pole-assignment control in a state in which a future state of another mobile object located in the main lane is assumed.

3. A driving assistance method comprising:
generating, by a driving assistance device, a target operation amount profile that is a time-series change in a target acceleration operation amount in a case where it is assumed that a velocity of a mobile object is adjusted until the mobile object reaches a target relative position when the mobile object merges into a main lane;
causing, by the driving assistance device, an information output device to output information when an actual acceleration operation amount that is an amount of acceleration operation performed on an acceleration operator by a driver of the mobile object has deviated from a prescribed range including the target acceleration operation amount,
acquiring information of a velocity and acceleration of the mobile object,
changing the target operation amount profile so that an initial target acceleration operation amount increases in the target operation amount profile when an index value based on the acceleration is greater than or equal to a reference value set in accordance with the velocity,
calculating the index value by multiplying the velocity by the acceleration during an observation period, and
setting the reference value such that the reference value is set to monotonically increase as the velocity increases.

4. A computer-readable non-transitory storage medium storing a program for causing a processor of a driving assistance device to:
generate a target operation amount profile that is a time-series change in a target acceleration operation amount in a case where it is assumed that a velocity of a mobile object is adjusted until the mobile object reaches a target relative position when the mobile object merges into a main lane,
cause an information output device to output information when an actual acceleration operation amount that is an amount of acceleration operation performed on an acceleration operator by a driver of the mobile object has deviated from a prescribed range including the target acceleration operation amount,
acquire information of a velocity and acceleration of the mobile object,
change the target operation amount profile so that an initial target acceleration operation amount increases in the target operation amount profile when an index value based on the acceleration is greater than or equal to a reference value set in accordance with the velocity, calculate the index value by multiplying the velocity by the acceleration during an observation period, and
set the reference value such that the reference value is set to monotonically increase as the velocity increases.

\* \* \* \* \*